D. HILL.
ELECTRIC HEATING SYSTEM.
APPLICATION FILED APR. 15, 1922.
1,437,420.
Patented Dec. 5, 1922.
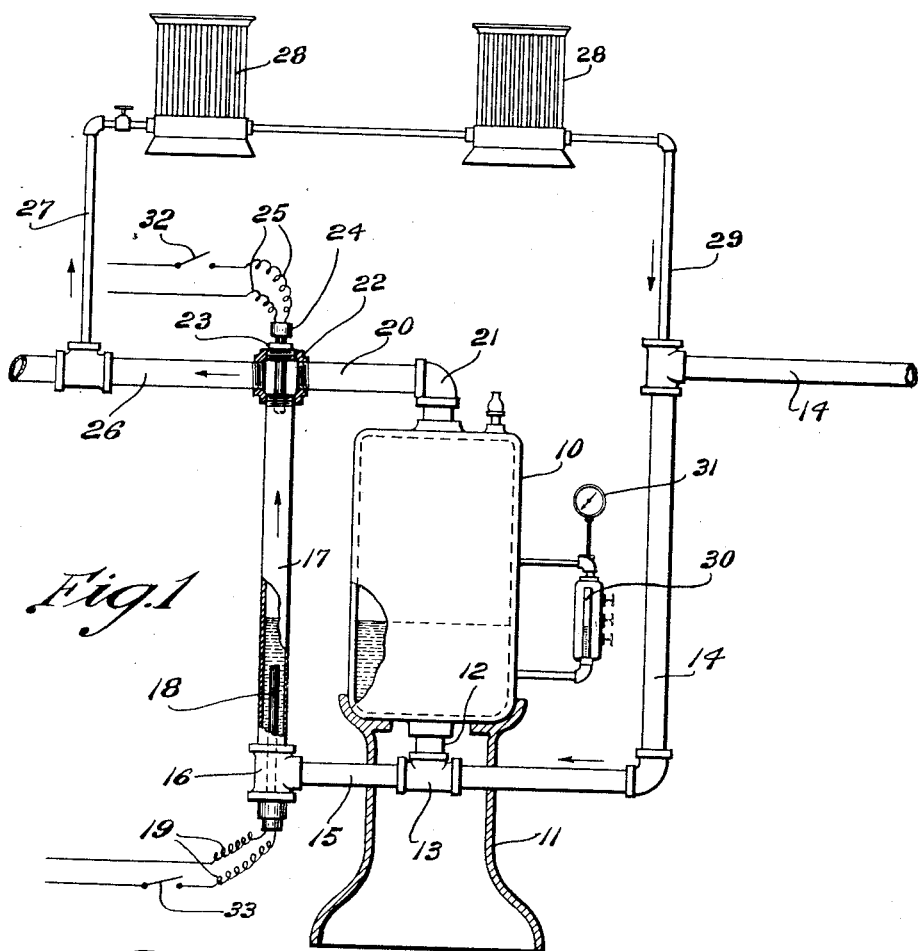
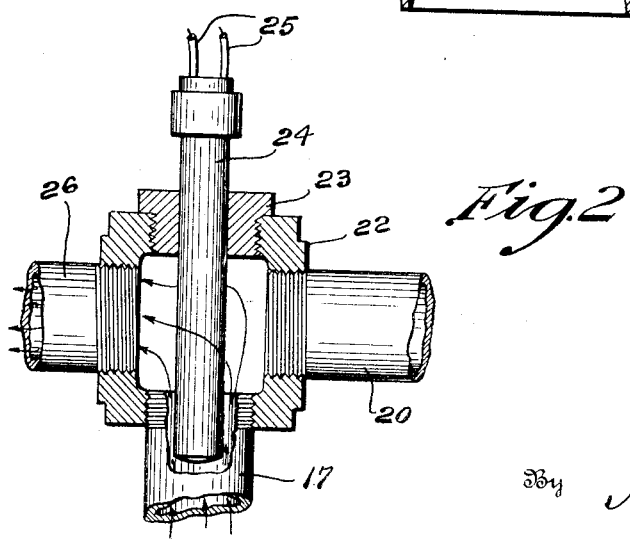
Inventor
David Hill
By Howard E. Barlow
Attorney Patented Dec. 5, 1922.

1,437,420

UNITED STATES PATENT OFFICE.

DAVID HILL, OF WEST BARRINGTON, RHODE ISLAND.

ELECTRIC HEATING SYSTEM.

Application filed April 15, 1922. Serial No. 553,084.

*To all whom it may concern:*

Be it known that I, DAVID HILL, a citizen of the United States, residing at West Barrington, in the county of Bristol and State of Rhode Island, have invented certain new and useful Improvements in Electric Heating Systems, of which the following is a specification.

This invention relates to a heating system for dwelling houses and other buildings, in which the temperature of the heating fluid is raised to the desired heat by means of one or more electrically-heated elements inserted into the system of piping, and the object of this invention is to position one of the heating elements in the piping below the fluid line, or adjacent the lower portion of the return pipe, to be immersed into the liquid in the pipe for quickly raising the temperature of this restricted portion of the heating fluid causing it to circulate through the system.

A further object of the invention is the provision of a second heating element located above the normal fluid line in the system for the purpose of super-heating the fluid as it passes this second heater to further raise its temperature and stimulate its circulating action.

With these and other objects in view, the invention consists of certain novel features of construction, as will be more fully described, and particularly pointed out in the appended claims.

In the accompanying drawings:

Figure 1 is a diagrammatic view illustrating the arrangement of apparatus in my improved heating system.

Figure 2 is an enlarged sectional side elevation showing the general arrangement of the second electrical heating element located in the system above the normal water line of a steam-heating system.

It is found in practice very desirable to provide means whereby the water in a heating system for dwelling houses and the like, may be heated by an electric current to generate sufficient steam to heat the house economically, and to do this in a simple and effective way it is necessary that an electrical heating element be applied to a restricted body of water such as that in the supply pipe for the system and also to provide a super-heating element in the supply pipe above the water line in the system to super-heat the steam to raise its temperature and stimulate its circulating action, and the following is a detailed description of one means by which this result may be accomplished:—

With reference to the drawings, 10 designates the steam chest or expansion tank of my improved heating system in which a low water level is preferably maintained, and this tank is supported on any suitable base 11. The bottom of this tank is tapped to receive the short nipple 12 which is screwed into the T 13 into one end of which the return pipe 14 is threaded and into the opposite end is threaded a short section 15 of the supply pipe, the opposite end of which section is connected to a T-member 16 into the top of which is threaded a riser 17 and through the bottom of which T is connected an electrical heating element 18 which is supplied with current through the wires 19.

Into the upper end of this tank is connected a pipe 20 through an elbow 21, its opposite end being connected to the cross fitting 22 of the supply pipe, whereby the surplus steam generated in the pipe 17 is permitted to pass over or back into the tank 10. In the upper end of this cross 22 I have provided a screw-threaded plug 23 through which is passed a second electrical heating element 24 which is arranged to act upon the rising steam generated by the lower element 18 to super-heat the same, and to also by super-heating stimulate the circulation of the steam through the system, which heating element is supplied with current through wires 25. The steam after being super-heated passes along the main pipe 26 and through the auxiliary supply pipes 27 to the heaters 28 and back through the return 29 to the main return 14 where it is again acted upon first by the lower heating element 18 and then by super-heating element 24 to again be forced around through the system to maintain a continuous circulation therethrough.

Connected to this tank 10 is a sight level indicator 30 by means of which the water level in the tank may be determined and a pressure indicator 31 is also connected to this sight feed supply to show the steam pressure in the system.

Switches 32 and 33 are inserted into two electric circuits whereby either one or both of the heating currents may be shut off.

I have herein shown and described an electric heating system as applied to a steam-heating plant but I do not wish to be restricted to the application of my heated elements to a steam-generating apparatus as this apparatus may be as equally well employed in a hot-water circulating system for heating or for raising the temperature of any other fluid.

The device is extremely simple and practical in construction and effective in its operation and by its use the temperature of a fluid may be quickly raised and by the application of the electrically-heated elements into the supply or feeding pipe of the heating apparatus where a relatively small quantity of water or fluid is being acted upon, the temperature may be rapidly raised to that required in the system. Then again by the employment of electrically heating elements for heating the fluid in this system the temperature may be automatically controlled by any suitable regulating device not shown.

The foregoing description is directed solely towards the construction illustrated, but various changes and modifications may be made without departing from the spirit and intent of my invention, which is defined and limited only by the terms of the appended claims.

I claim:

1. In an electric-heating system, a fluid expansion tank, a fluid feed pipe for said tank, a supply pipe for the heating system, an electric heating element in said supply pipe below the fluid line in said tank, and a second heating element in said supply-pipe above the first heating element for stimulating the circulation of the fluid in the system.

2. In an electric-heating system, a steam expansion tank, a water feed pipe for said tank, a steam supply pipe for said system, an electric-heating element in said supply pipe below the water line in said tank, and a second heating element in said supply pipe above the water line in said tank for superheating the steam to stimulate its circulation through the system.

3. In an electric heating system, a steam expansion tank, a water feed pipe for said tank, a steam supply pipe for said system, an electric-heating element in said supply pipe below the water line in said tank, and a second heating element in said supply pipe above the water line in said tank for superheating the steam to stimulate its circulation through the system, said supply pipe being arranged to communicate with both the top and bottom portions of said tank.

4. In an electric-heating system, a fluid expansion tank, a fluid feed pipe for said tank, a supply pipe for the heating system, an electric-heating element in said supply pipe below the fluid line in said tank, a second heating-element in said supply pipe above the first heating element for stimulating the circulation of the fluid in the system, and means for shutting off the electric current to either one or both of said heating elements.

In testimony whereof I affix my signature.

DAVID HILL.